(12) United States Patent
Konttinen

(10) Patent No.: US 7,478,322 B2
(45) Date of Patent: Jan. 13, 2009

(54) METHOD AND ARRANGEMENT FOR DISPLAYING HYPERTEXT PAGES

(75) Inventor: Hannu Konttinen, Helsinki (FI)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 10/014,773

(22) Filed: Dec. 11, 2001

(65) Prior Publication Data

US 2002/0078084 A1 Jun. 20, 2002

(30) Foreign Application Priority Data

Dec. 15, 2000 (FI) .................................. 20002749

(51) Int. Cl.
  *G06F 17/00* (2006.01)
(52) U.S. Cl. ...................... 715/253; 715/204; 715/273; 715/792
(58) Field of Classification Search ................. 715/500, 715/1, 501.1, 512, 253, 204, 273, 792; 705/6
See application file for complete search history.

(56) References Cited

U.S. PATENT DOCUMENTS

| 4,773,009 A | 9/1988 | Kucera et al. ............. 364/419 |
| 5,623,679 A * | 4/1997 | Rivette et al. ............. 715/526 |

(Continued)

FOREIGN PATENT DOCUMENTS

EP 0949571 A2 10/1999

(Continued)

OTHER PUBLICATIONS

CPAN: "Text-Reflow 1.00", Retrieved from the Internet: URL: http://search.cpan.org/src/MWARD/Text-Reflow-1.00, Mar. 3, 2004, entire document.

(Continued)

*Primary Examiner*—Stephen S Hong
*Assistant Examiner*—Matthew J Ludwig
(74) *Attorney, Agent, or Firm*—Perman & Green, LLP

(57) ABSTRACT

The invention relates to a method and arrangement for reading hypertext pages especially on mobile phone display screens. A device is provided with a program which "understands" some basic rules of written language such as punctuation, conjunctives connecting parts of sentences, and the direction of reading. A low-resolution display (300) is divided into a navigation pane (320) and read pane (330). The selected hypertext page is decoded, and an overall view thereof, preprocessed in a predetermined manner, is brought into the navigation pane. A length of text cut off according to the said rules is brought at a time into the read pane from the area indicated by a cursor (310). The text is so short that it is easily readable as far as the size of the characters is concerned. The device has predefined key functions to move forward or backward in the text one step at a time or by skipping text passages if desired. The words displayed at a time on the display constitute a factual entity or at least belong to the same factual entity, whereby the reading of the text on the hypertext page is easy despite the limitations of the display. The invention may also be used for data searching in a relatively large mass of information.

15 Claims, 3 Drawing Sheets

U.S. PATENT DOCUMENTS

| | | | | |
|---|---|---|---|---|
| 5,634,064 | A * | 5/1997 | Warnock et al. | 715/513 |
| 6,850,260 | B1 * | 2/2005 | Taylor | 715/835 |
| 6,928,609 | B2 * | 8/2005 | Bricklin et al. | 715/501.1 |
| 7,159,172 | B1 * | 1/2007 | Bentley et al. | 715/526 |
| 2002/0116420 | A1 * | 8/2002 | Allam et al. | 707/526 |

FOREIGN PATENT DOCUMENTS

| | | |
|---|---|---|
| GB | 2 137 788 | 10/1984 |
| WO | 9822910 A | 3/1997 |

OTHER PUBLICATIONS

"Minutes from Apr. 10-11 UA face-to-face." W3C User Agent Accessibility Guidelines Working Group, Apr. 11, 2000. http://lists.w3.org/Archives/Public/w3c-wai-ua/2000AprJun/0066.html.

Communication pursuant to Article 94(3) EPC, Application No. 01 660 226.0, dated Feb. 12, 2008.

"Pad++: A Zoomable Graphical Sketchpad For Exploring Alternate Interface Physics", Pederson et al., Proceedings of ACM UIST '94.

"HTML 4.01 Standard", Dave Ragget, Dec. 24, 1999, 9 pages, http://www.w3.org/TR/html401.

* cited by examiner

METHOD AND ARRANGEMENT FOR DISPLAYING HYPERTEXT PAGES

The invention relates to a method for reading hypertext pages on small displays. The method finds particular utility in mobile phones. The invention further relates to an arrangement for reading hypertext pages on small displays.

New features are continually being developed for mobile communication networks and mobile phones. One such feature is an Internet interface in a mobile phone. Understandably, the applicability of a mobile phone as an Internet terminal is very poor. The phone and the channel of the mobile communication network can just barely be used for sending and receiving e-mail messages, but normal browsing of web pages is impossible not only because of the very limited capacity of the channels but also because of the display technology applied in the phones. A feasible browsing feature, even a limited one, would substantially add to the usefulness of the Internet interface.

Figure 1A:
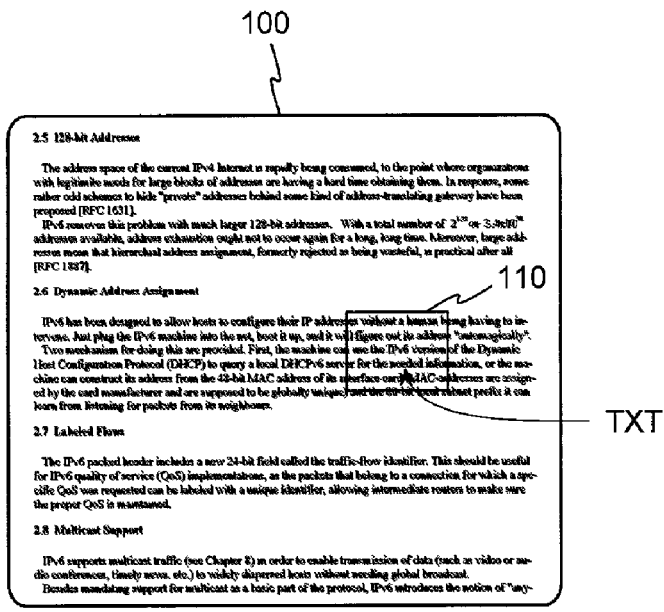
Figure 1B:
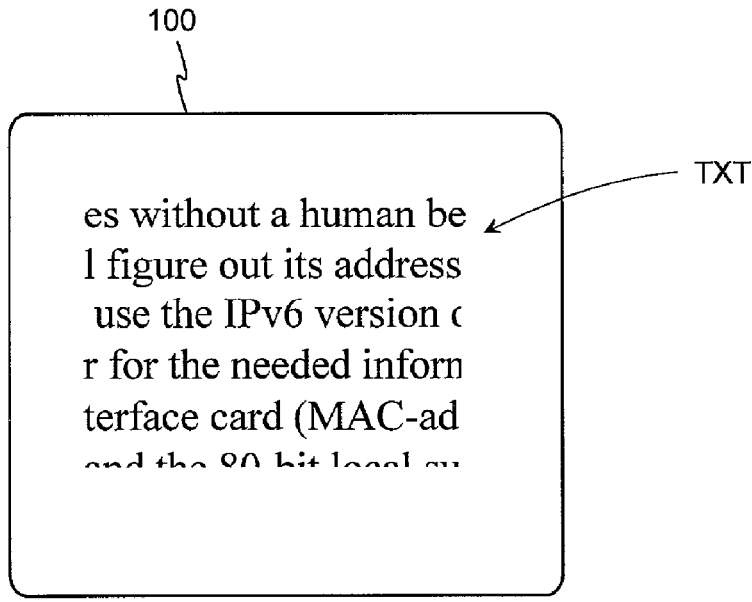

From the prior art it is known to use zooming in order to view pages written in e.g. HTML (Hypertext Markup Language) on a low-resolution display. This means that a relatively small portion of the whole page is enlarged to fill the display so that details will become visible. The area to be enlarged can of course be selected. FIGS. 1a,b illustrate such a method. FIG. 1a shows a display 100 which in this example displays a page containing text only. The system comprises a movable zooming window 110 which encloses a certain portion TXT of the text on the page. In FIG. 1b the zooming is on so that the text TXT is displayed enlarged on the display 100. It can be seen that the area enlarged cuts the text off at a random point both in the horizontal and vertical direction. Grasping the meaning of an individual sentence may require several successive zoomings so that reading a longer text becomes very straining. Thereby the method has the disadvantage of being poorly suited for reading text passages on pages.

An object of the invention is to eliminate the above-mentioned disadvantages associated with the prior art. The method according to the invention is characterized by that which is specified in the independent claim 1. The arrangement according to the invention is characterized by that which is specified in the independent claim 7. Some advantageous embodiments of the invention are specified in the other claims.

The basic idea of the invention is as follows: A device used for reading is provided with a program which "understands" some basic rules concerning the syntax of written language, such as punctuation, conjunctives connecting parts of sentences, and the direction of reading. A low-resolution display is divided into a navigation pane and read pane. A selected hypertext page is decoded and an overall view thereof, preformatted in a predetermined manner, is brought into the navigation pane which includes a movable cursor. A length of text cut off according to the above-mentioned rules is brought at a time into the read pane from the area indicated by the cursor. The text is so short that it is easily readable as far as the size of the characters is concerned. The device has predefined key functions to move forward or backward in the text one step at a time or by skipping text passages if desired. The cursor in the navigation pane shows all the time the current position on the page.

An advantage of the invention is that text on a hypertext page can be easily read despite the limitations of the display. This is due to the fact that the words displayed at a time on the display constitute a factual entity or at least belong to the same factual entity, and the reader can move forward in the text simply by pressing a certain key. The passages of text, which in itself are sensible, can be linked together quickly, making it easy to grasp the contents of even a long sentence. Another advantage of the invention is that it can be used for searching for information in a relatively large amount of data by just arranging suitable references in the navigation pane from a large material and examining the contents of the references by means of the read pane.

Figure 3:
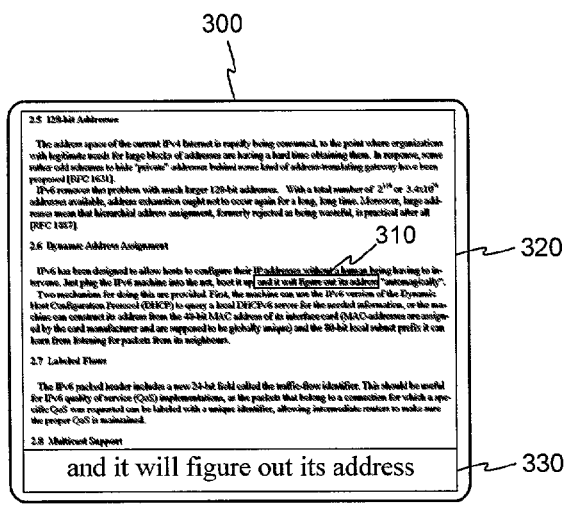
Figure 4:
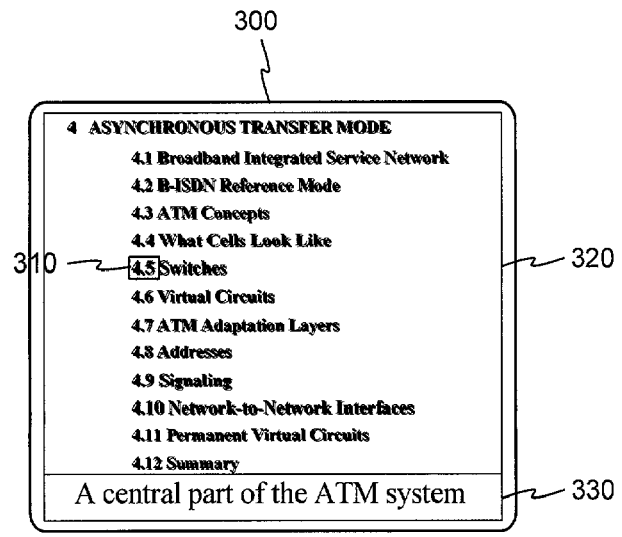
Figure 5:
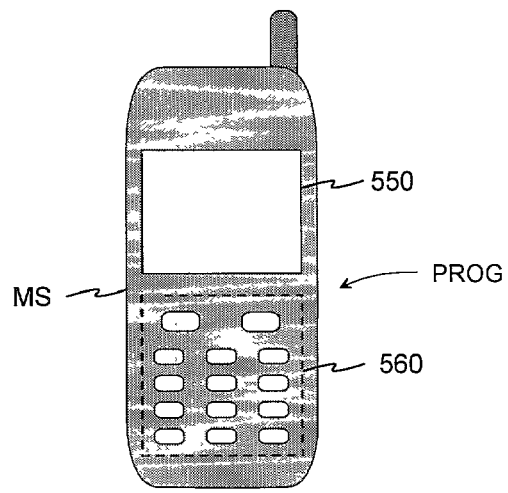

The invention is below described in detail. The description refers to the drawings attached, in which FIGS. 1a,b show an example of how a hypertext page is read according to the prior art, FIG. 2 shows an example of the method according to the invention in the form of flow diagram, FIG. 3 shows an example of how a hypertext page is read according to the invention, FIG. 4 shows another example of how a hypertext page is read according to the invention, and FIG. 5 shows an example of a mobile phone provided with functions according to the invention.

FIG. 1 was already explained in connection with the description of the prior art.

Figure 2:
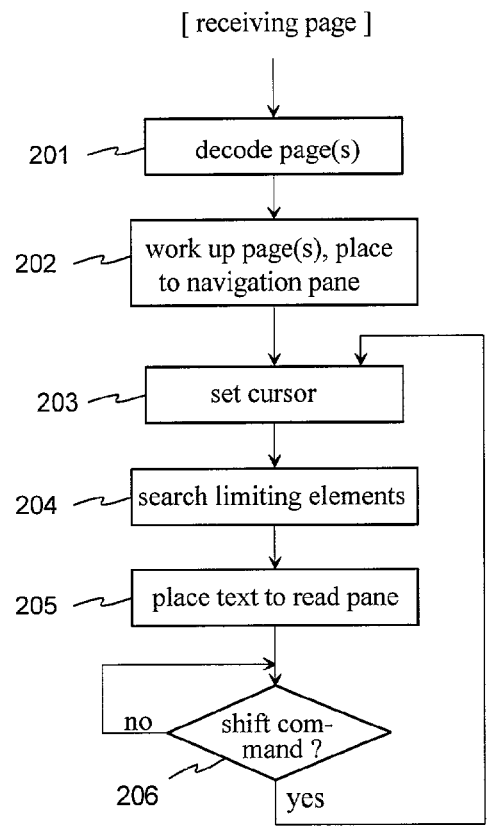

FIG. 2 shows an example of the method according to the invention in the form of flow diagram. A received page, which is written, or encoded, in HTML, for example, is decoded in step 201. In step 202 the decoded page is brought onto the display of a mobile phone. The display is divided into two parts, navigation and read panes. An overall view of the page(s) is shown in the navigation pane. An overall view refers in this description and in the claims to a received page stripped of potential graphic portions, or to text passages selected from one or more pages according to the criteria defined by the user. In the former case the view in the navigation pane is usually somewhat blurred because of the low resolution of the display. In the latter case, a relatively small quantity of the said text passages are selected at any one time so that they can be read in the navigation pane. The text passages constitute a sort of information map for data searching.

In step 203 the keys in the keypad of the phone are used to place the cursor in the desired position in the navigation pane. The cursor may be e.g. a horizontal bar indicating the amount of text that fits in the read pane at a time. In step 204 the program according to the invention goes through the received character string starting from the point indicated by the cursor and looks for suitable start and end points for the text portion to be displayed in the read pane. The language in question is given as a parameter to the program. The search for the start and end points is based on language-specific rules, such as punctuation marks of written language and some basic rules of syntax. Of the latter, the program is able to take into account conjunctive words such as "and" and "so". Prepositions may also be used, for example, depending on the language. Such verbal break-off elements are placed at the beginning of the text displayed in the read pane, whereas punctuation marks used as break-off elements are placed at the end of the text displayed in the read pane.

The search for the start and end points typically produces a passage of text consisting of a few words, constituting a small understandable entity. If no break-off point is found that would be good from the understandability standpoint, the program cuts the text between words. The portion of text between the selected start and end points is then placed in the read pane of the display, step 205. On the basis of the selected language the program "knows" the direction of reading, too. In some non-western languages, for example, the direction of reading is from right to left. Then the text point corresponding to the said start point will naturally be positioned on the right edge of the read pane.

In step 206 the program awaits user input. In accordance with the invention a command has been defined which can be entered by pressing a key in order to move one step forward, without a distance, from the position currently in the read pane. In addition, the following commands are defined: Move one step back without a distance, move to the beginning of the next paragraph, move back to the nearest start of paragraph, move to the next subtitle, and move to the previous subtitle. After the command the program moves the cursor in the navigation pane to the corresponding position (step 203) and continues in accordance with steps 204, 205 and 206.

FIG. 3 shows an example of the reading of a hypertext page according to the invention when the language selected is English. On the basis of the language selection the direction of reading is from left to right. Shown in FIG. 3 is a display screen 300 divided into a navigation pane 320, the size of which almost equals the size of the display screen, and a read pane 330, the width of which equals that of the display screen but which is relatively low. A page containing only text has been brought into the navigation pane. The page in this example is the same as that in the prior-art example of FIGS. 1*a,b*. The system comprises a movable bar-like cursor 310. The shape of the cursor is irrelevant; it may be a blinking dot, for instance. After the cursor has been positioned, the software according to the invention has searched the character string for suitable start and end points in the area indicated by the cursor and placed the text which is between the said start and end points, enlarged in the read pane 330. In the example of FIG. 3 the passage of text is and it will figure out its address which is a portion of the sentences Just plug the IPv6 machine into the net, boot it up, and it will figure out its address "automagically". Two mechanism for doing this are provided. First, the machine can use the IPv6 version of the Dynamic Host Configuration Protocol (DHCP) to query a local DHCPv6 server for the needed information, . . .

It is seen that the text brought into the read pane is in itself an understandable entity.

Pressing the "read forward" key would bring into the read pane e.g. the following text passages:

"automagically".
Two mechanism for doing this
are provided.
First, the machine can use
the IPv6 version
of the Dynamic Host
Configuration Protocol (DHCP)
to query a local DHCPv6 server
for the needed information, In this example the program has used the word "and", a full stop, and prepositions "of" and "for" as break-off criteria. A further criterion has of course been the size of the read pane. Pressing the "read back" key in the initial situation given above would first bring into the read pane e.g. the text into the net, boot it up, and then Just plug the IPv6 machine FIG. 4 shows another example of the reading of hypertext pages according to the invention. Shown in FIG. 4 is a display screen 300 which, just as in FIG. 3, is divided into a navigation pane 320 and read pane 330. In this case, several pages have been received from the network. The software according to the invention is set so as to preprocess the material so that the titles of chapters and at least part of the subtitles are picked from the text portion. As titles are recognized character strings starting with a number following a line feed or carriage return code. Now the navigation pane displays only a certain number of titles in the order that they were found. Browsing the titles can be continued in that operating mode of the system. Criteria may be set for titles to be selected so that only a small fraction of all the titles may be displayed in the navigation pane. As the user sees titles that appear interesting, he moves the cursor 310 to one of them and gives a read command. The program will then bring into the read pane 330 the beginning of the sentence following the title in question (or, first, a title of the next lower hierarchy level, if one exists). In the example of FIG. 4 there is such a subtitle, namely Switches, and in the read pane it can be seen that the text following the title begins "A central part of the ATM system . . . " The reading may then continue as described above.

FIG. 5 shows an example of a mobile phone provided with the functions according to the invention. The phone MS comprises a display 550, keyboard 560 and software according to the invention. From the basic menu of the phone the user may select the "Internet" mode. The functions according to the invention are started from either submenus or directly by pressing predetermined keys. Relatively small transitions in the text fall into the latter function group. A software part PROG realizes the limiting of the text displayed at a time in the read pane as well as the said transitions within the text.

Above it was described the reading of web pages according to the invention. The invention is not limited to the reading techniques just described. The inventional idea expressed in the independent claims 1 and 7 may be applied in numerous different ways.

The invention claimed is:

1. A method for reading text on hypertext pages, in which received pages are decoded and a certain reading portion of a page, indicated by a cursor, is enlarged onto a display used as an output device, wherein shift commands are defined in order to use the method, the method comprising:

preprocessing the pages in order to read the text portion in them, dividing the display into a navigation pane and a read pane;

placing an overall view of at least one decoded page to the navigation pane;

storing language specific rules of syntax in a memory;

sequentially processing the text, based on the stored language specific rules of syntax, to identify a start element and end element, selecting a first text portion between the start element and end element as the reading portion and placing the selected portion on the read pane, and further processing connected portions of the selected text for a new start element and a new end element and selecting the text portion between the new start element and new end element of a second text portion and placing the selected contiguous portion on the read pane, if a shift command is received.

2. A method according to claim 1, said start element being a punctuation mark preceding a sentence.

3. A method according to claim 1, said end element being one of the following: a space character following a punctuation mark, a fine feed character, characters constituting a preposition.

4. A method according to claim 1, said shift commands including:

one step forward,
one step back,
to the beginning of next paragraph, back to the beginning of paragraph,
to the beginning of next title, and
to the beginning of preceding title.

5. A method according to claim 4, a corresponding new start element being respectively:
the character preceding the current end element,
the preceding start element,
the character preceding the first character in the next paragraph,
the first preceding line feed character,
the character preceding the first character in the next title, and
the character preceding the first character in the preceding title.

6. A method according to claim 1, a maximum length of said reading portion being a selectable parameter.

7. An arrangement for reading text on hypertext pages, the arrangement comprising:
a display and means for decoding a received page,
the arrangement further comprising a processor for dividing the display into a navigation pane and read pane and for bringing an overall view of the received pages in the navigation pane,
a memory operably associated with the processor to store a program and language specific rules of syntax;
said processor adapted to select a first reading portion from said navigation pane for display in said pane by executing the program, wherein said program is adapted to find a start point and an end point for the first reading portion on the basis of the language specific rules of syntax and to change the selected first reading portion to a sequentially contiguous second selected reading portion based on the language specific rules of syntax according to user commands.

8. An arrangement according to claim 7, further comprising at least two keys for entering said user commands.

9. An arrangement according to claim 7, said overall view comprising a text contents of an individual hypertext page.

10. An arrangement according to claim 7, said overall view comprising selected portions of text contents of hypertext pages, which portions are selected according to certain criteria.

11. An arrangement according to claim 10, said portions selected according to the certain criteria being text titles.

12. An arrangement according to claim 7, said program, which searches a start and end point for the reading portion based on rules of written language, comprises as a selectable parameter the language to be used.

13. An arrangement according to claim 7, further comprising a cursor movable in the said navigation pane in order to select a start point for the text to be read.

14. A mobile communication device comprising a display, a keyboard and a means for receiving, decoding and displaying hypertext pages requested from servers connected with the Internet, the mobile communication device further comprising:
a display driver for dividing the said display into a navigation pane and read pane,
a processor for bringing an overall view of the received pages in the navigation pane, and
a memory operably associated with the processor to store a program and language specific rules of syntax;
a program adapted to cause said processor to select a first reading portion from said navigation pane for display in said read pane, wherein said program is further adapted to find a start point and an end point for the first reading portion on the basis of the language specific rules of syntax and to change the first selected reading portion to a sequentially contiguous second selected reading portion based on the language specific rules of syntax according to user commands.

15. A software product for reading text on hypertext pages, comprising:
processor readable program code arranged to cause the processor to decode received pages and display the text portion in them on a display,
processor readable program code arranged to cause the processor to divide the display into a navigation pane and read pane,
processor readable program code arranged to cause the processor to place an overall view of at least one decoded page to the navigation pane,
processor readable program code arranged to cause the processor to store language specific rules of syntax;
processor readable program code arranged to cause the processor to search the text, based on the language specific rules of syntax, for a start element and end element,
processor readable program code arranged to cause the processor to select a first text portion between the start element and end element as the reading portion and to display the selected first text portion on the read pane, and
processor readable program code arranged to cause the processor to search for a new start element and a new end element and to select a second text portion between the new start element and new end element as a new reading portion sequentially contiguous to said first text portion and placing the second text portion on the read pane, if a shift command is received.

* * * * *

UNITED STATES PATENT AND TRADEMARK OFFICE
CERTIFICATE OF CORRECTION

PATENT NO.         : 7,478,322 B2
APPLICATION NO.    : 10/014773
DATED              : January 13, 2009
INVENTOR(S)        : Hannu Konttinen It is certified that error appears in the above-identified patent and that said Letters Patent is hereby corrected as shown below:

In Column 4, Line 39, Claim 1, delete "read" and insert --display--, therefor.

In Column 4, Line 54, Claim 1, after "text" insert --portion contiguous to said first text portion for display as the next reading--.

In Column 4, Line 61, Claim 3, delete "fine" and insert --line--, therefor.

In Column 5, Line 27, Claim 7, after "said" insert --read--.

In Column 6, Line 9, Claim 14, after "pane," delete "and".

Signed and Sealed this

First Day of September, 2009

David J. Kappos
*Director of the United States Patent and Trademark Office*